United States Patent [19]

Kobayashi et al.

[11] Patent Number: 5,103,377
[45] Date of Patent: Apr. 7, 1992

[54] PORTABLE ELECTRONIC APPARATUS HAVING A CONTACT TERMINAL ELECTRICALLY CONTACTING A BATTERY THROUGH A COVER OF A MOUNTING RECESS

[75] Inventors: Takaichi Kobayashi; Mitsuhiro Yoshida, both of Tokyo, Japan

[73] Assignee: Kabushiki Kaisha Toshiba, Kawasaki, Japan

[21] Appl. No.: 717,836

[22] Filed: Jun. 21, 1991

[30] Foreign Application Priority Data

Jun. 25, 1990 [JP] Japan .................................. 2-166220

[51] Int. Cl.⁵ .......................... H05K 5/02; G06F 1/00
[52] U.S. Cl. ..................... 361/394; 361/380; 429/123
[58] Field of Search .................. 429/96, 97, 98, 99, 429/100, 123; 364/708; 361/380, 390, 391, 392, 393, 394, 395, 399, 412, 415, 429

[56] References Cited

U.S. PATENT DOCUMENTS

| | | | |
|---|---|---|---|
| 4,571,456 | 2/1986 | Paulsen et al. | 364/708 X |
| 4,864,523 | 9/1989 | Sasaki | 364/708 |
| 5,001,659 | 3/1991 | Watabe | 364/708 |
| 5,043,846 | 8/1991 | Kinoshita | 361/394 |

FOREIGN PATENT DOCUMENTS 64-54369 4/1989 Japan .

OTHER PUBLICATIONS

Toshiba T1600 Portable Personal Computer User's Manual, copyright 1988, pp. i, 2-1 thru 2-7, 4-20 thru 4-25.

Primary Examiner—Leo P. Picard
Assistant Examiner—Michael W. Phillips
Attorney, Agent, or Firm—Cushman, Darby & Cushman

[57] ABSTRACT

A portable computer including a base unit having a keyboard, and a display unit. In the display unit, there is a leg portion having a cable guide passage. In an upper surface of the base unit, there is formed a leg mounting portion receiving the leg portion and a mounting recess, which is adjacent to the leg mounting portion for attaching a battery thereto. The leg mounting portion has a wall with an opening section opening into the base unit. The opening section is covered with a cover. The cover has a cover wall forming a cable through hole in cooperation with the wall of the leg mounting portion. A cable is wired between the cable through hole and the cable guide passage. The cable electrically connects the base unit and the display unit. In the mounting recess, there is arranged a contact terminal electrically contacting the battery. The contact terminal is attached to the cover arranged between the leg mounting portion and the mounting recess.

18 Claims, 9 Drawing Sheets

PORTABLE ELECTRONIC APPARATUS HAVING A CONTACT TERMINAL ELECTRICALLY CONTACTING A BATTERY THROUGH A COVER OF A MOUNTING RECESS

BACKGROUND OF THE INVENTION

1. Field of the Invention

The present invention relates to a portable electronic apparatus such as a lap-top type computer or a word processor, and more particularly, the portable electronic apparatus having a battery functioning as a drive power source in a base unit of the apparatus, the structure for attaching a contact terminal electrically contacting the battery to the base unit.

2. Description of the Related Art

In recent years, there has been widely used a lap-top type portable computer having a keyboard and a flat panel type display unit.

This type of portable electronic apparatus comprises a base unit having a keyboard, and a display unit supported by the base unit. The display unit is rotatably attached to the base unit to rotate between a closed position where the keyboard is covered and an open position where the keyboard is exposed when the keyboard is operated. Due to this, conventionally, a leg portion is formed in the display unit, and a leg mounting portion to enter the leg portion is formed in the base unit. Then, the leg portion is rotatably connected to the leg mounting portion by a hinge.

In the conventional apparatus, there is wired a cable for electrically connecting the base unit and the display unit to each other. U.S. patent application Ser. No. 07/542,061 filed June 22, 1990 discloses an apparatus wherein a cable is guided through the inside of the hinge connecting the base unit and the display unit. In the one end and the other end of the cable, there are connectors electrically connected to the base unit and the display unit.

Moreover, in the above apparatus, there is used the structure using a battery, which is incorporated into the base unit, as the drive power source. This battery must be detached from the base unit when being charged. For this reason, in the above conventional apparatus, there is formed a receiving recess for receiving the battery in the rear portion of the base unit. Also, in the receiving recess, there is arranged a contact terminal contacting the positive and negative terminals of the battery.

In recent years, the entire body of the apparatus including the base unit has been miniaturized in order to improve the portability of the apparatus. In the apparatus wherein the receiving recess and the leg mounting portion are formed on the base unit whose size is limited, as the miniaturization of the apparatus is improved, there is established a positional relationship in which the receiving recess and the leg mounting portion are positioned to be adjacent to each other.

In this case, if the contact terminal of the receiving recess is positioned at the end surface adjacent to the leg mounting portion of the receiving recess, there must be surely formed a space for positioning the contact terminal in a narrow portion between the receiving recess and the leg mounting portion. Moreover, in the base unit, there must be formed a support section for supporting the contact terminal in a narrow portion between the receiving recess and the leg mounting portion. For this reason, difficulty in arranging the parts in the base unit often occurs and the miniaturization of the base unit is limited.

Since the hinge portion must be also miniaturized together with the miniaturization of the base unit, a passage through which the cable passes, becomes increasingly narrow. Therefore, the working ability of wiring the cable becomes difficult, due to passing the cable through the narrow passage.

SUMMARY OF THE INVENTION

An object of the present invention is to provide a portable electronic apparatus wherein a contact terminal can be arranged in a base unit without difficulty, the base unit can be miniaturized, and working ability of wiring a cable can be easily made.

The portable electronic apparatus of the present invention comprises a display unit including a leg portion having a cable guide passage therein; a base unit including an upper surface having a leg mounting portion receiving the leg portion to the upper surface and a wall including an opening section opening into the base unit, and a mounting recess opening to the upper surface to be adjacent to the leg mounting recess for attaching a power supply thereto. The opening section is covered with a cover, and the cover has a cover wall for forming a cable through hole in cooperation with the wall. The cable is guided through the cable through hole and the cable guide passage. The cable is electrically connected to the display unit and the base unit. In the mounting recess, there is arranged a contact terminal electrically contacting the power supply. The contact terminal is attached to the cover, and arranged between the mounting recess and the leg mounting portion.

According to the above arrangement, the contact terminal is attached to the cover for forming the cable through hole in cooperation with the wall of the leg mounting portion. Due to this, even if the leg mounting portion and the mounting recess are adjacent to each other, there is no need that a special part for supporting the contact terminal be arranged therebetween. Moreover, there is no need to provide a space for arranging such a part. Therefore, the base unit can be miniaturized and the contact terminal can be arranged in the base unit whose size is limited without difficulty.

Furthermore, when the opening section is covered with the cover, the cable through hole which the cable passes is formed between the leg mounting portion and the cover. Due to this, at the time when the cable is guided through the opening section in advance and covered with the cover, the cable is in a state that the cable is guided through the cable through hole if the cable is inserted between the wall of the cover and the that of the leg mounting portion. Therefore, no complicated working is required, which takes much time, when a cable is inserted into the small hole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
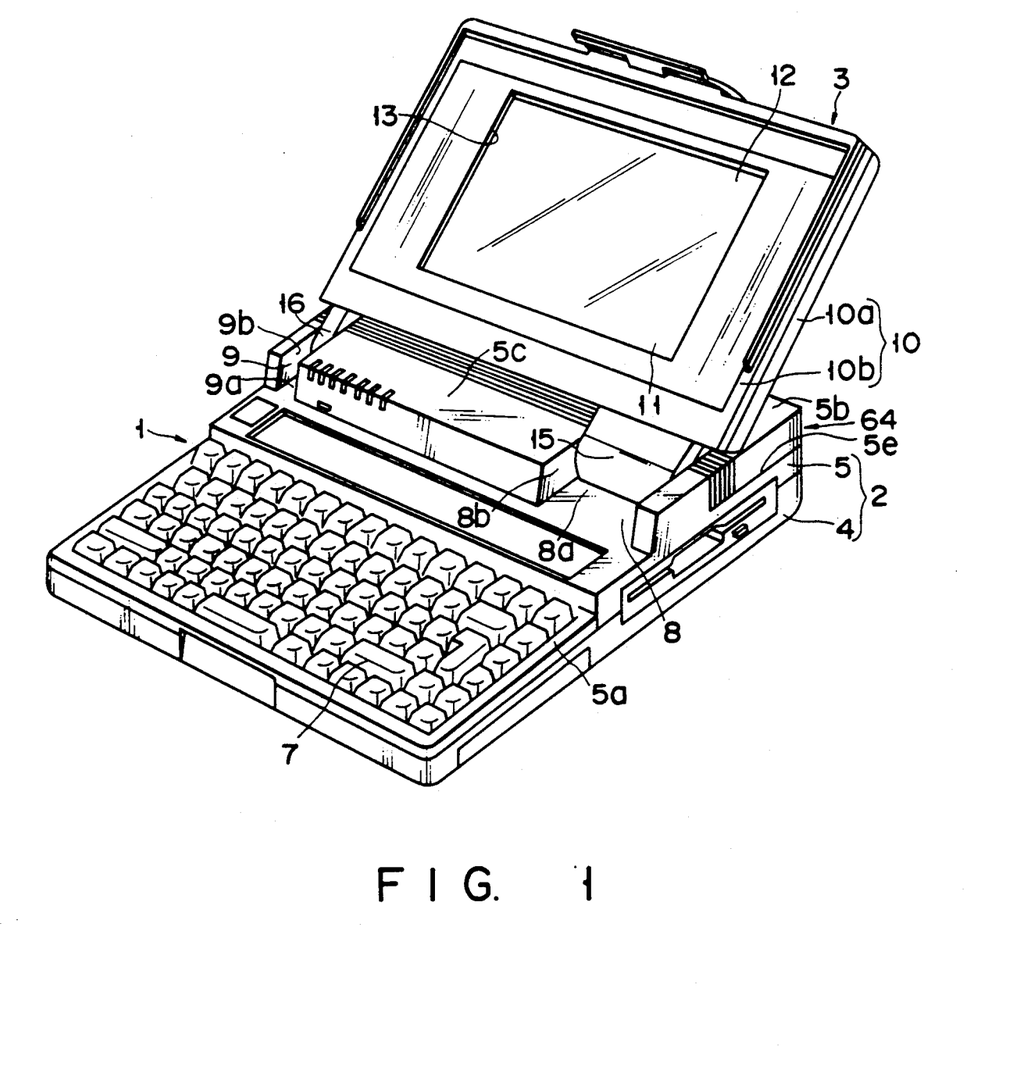
FIG. 1 is a perspective view of a portable computer according to the present invention.

FIG. 1 shows a lap-top type portable computer 1. The portable computer 1 comprises a square and box shaped base unit 2 and a flat panel type display unit 3. The base unit 2 comprises a bottom case 4 serving as a bottom plate and a top cover 5. A printed circuit board 6 is contained in the base unit 2, a number of circuit parts (not shown) are mounted thereon.

The top cover 5 has a front portion 5a and a rear portion 5b. A keyboard 7 is attached to the front portion 5a of the top cover 5. The rear portion 5b of the top cover 5 extends upward than the keyboard 7. The rear portion 5b of the top cover 5 has an upper surface 5c, a rear surface 5d, which is continuous with the upper surface 5c, and right and left side surfaces 5e, which are continuous with the upper surface 5c and the rear surface 5d. On the upper surface 5c of the rear portion 5b, there are formed a pair of leg mounting portions 8, 9 for supporting the display unit 3.

Figure 2:
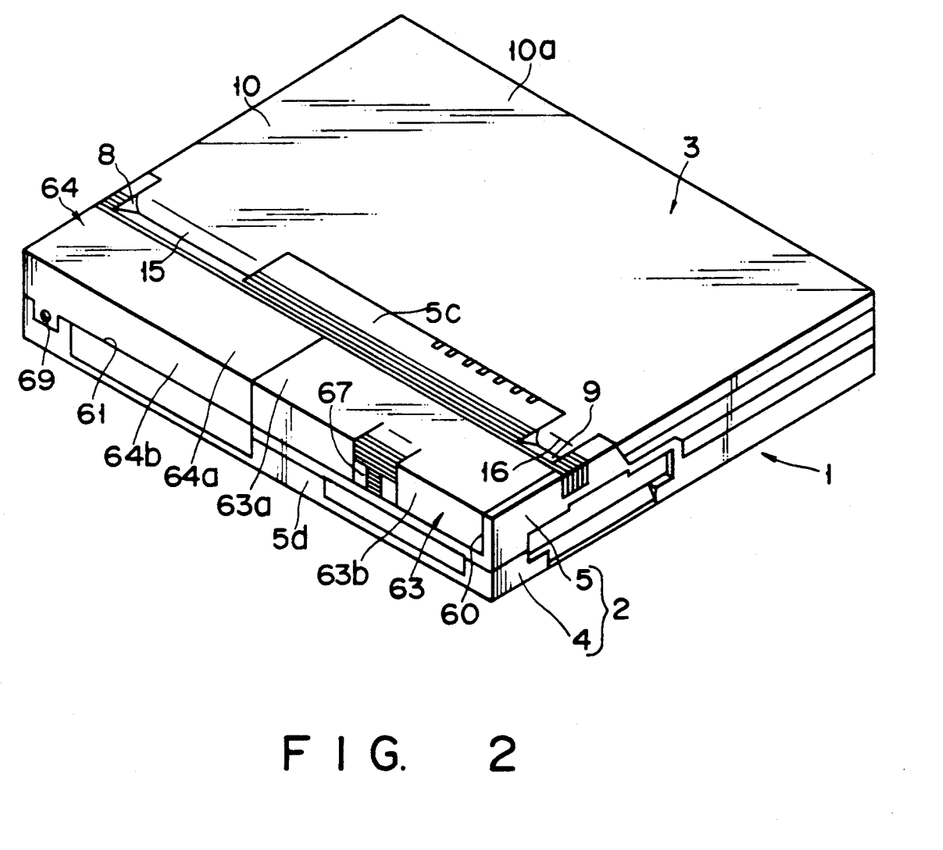
FIG. 2 is a perspective view of the portable computer and showing a state that a display unit is rotated at a closed position where a keyboard is covered.

The display unit 3 comprises a housing 10 and a flat liquid crystal display 11 contained in the housing 10. The housing 10 comprises a rear panel 10a and a front panel 10b, and the front panel 10b has an opening 13 by which a display screen 12 of the liquid crystal display 11 is exposed. In the housing 10, there are formed a first leg portion 15 and a second leg portion 16. These leg portions 15 and 16 are inserted into the leg mounting portions 8 and 9 of the top cover 5 and rotatably connected to the leg mounting portions 8 and 9, respectively. By this connection, the display unit 3 is rotated between the closed position at which the keyboard 7 is covered and the open position at which the keyboard 7 is exposed. As shown in FIG. 2, in a state that the display unit 3 is rotated to the closed position, the base panel 10a is formed to be flush with the upper surface 5c of the rear portion 5b. Thereby, the portable computer 1 is formed to be flat and box-shaped, and it is convenient for a person to carry the computer 1.

Figure 4:
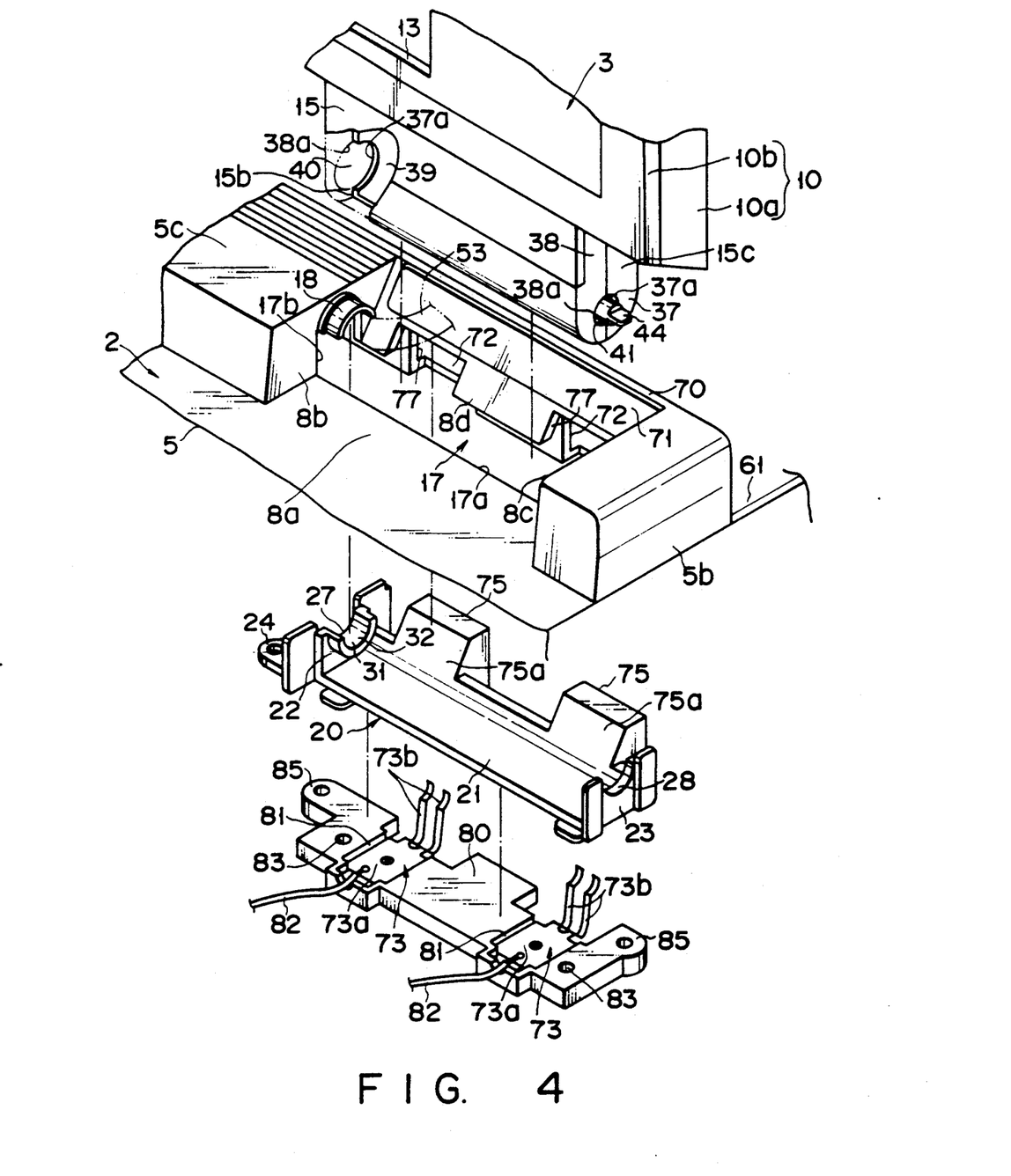
FIG. 4 is an exploded perspective view showing a portion where the leg mounting portion of the base unit is connected to the first leg portion of the display unit.

One leg mounting portion 8 where the first leg portion 15 of the display unit 3 is inserted is formed to be wider in the right and left directions than the other leg mounting portion 9. As shown in FIG. 4, the leg mounting portion 8 has a bottom surface 8a, and right and left surfaces 8b and 8c, and a rear surface 8d, which are continuous with these surfaces 8a, 8b, and 8c. In the leg mounting portion 8, there is formed an opening section 17. The opening section 17 comprises a bottom opening part 17a opening to the bottom surface 8a and side opening parts 17b and 17c opening to the right and left side surfaces 8b and 8c. The bottom opening part 17a and the side opening parts 17b and 17c are continuous with each other. The upper edge portions of the side opening parts 17b and 17c are shaped in a form of a circular arc. In the upper edge portion of the side opening part 17b on the left side, there is formed a semi-cylindrical guide portion 18. The guide portion 18 projects into the leg mounting portion 8.

Figure 9:
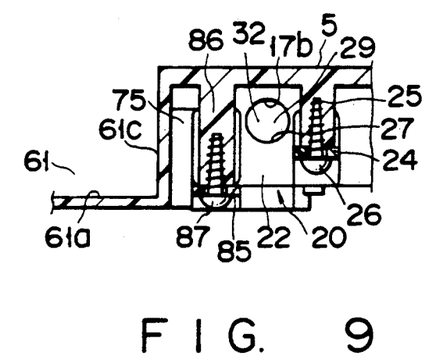
FIG. 9 is a cross sectional view taken along a line IX—IX of FIG. 7.

As shown in FIG. 4, a cover 20 is attached to the top cover 5 to cover the opening section 17 from the inside of the top cover 5. The cover 20 comprises a bottom wall 21 covering the bottom opening part 17a, and a pair of side walls 22 and 23 covering side opening parts 17b and 17c. One side wall 22, there is formed a connecting piece 24 for connecting the cover 20 to the top cover 5. The connecting piece 24 is overlay on a boss 25 formed inside of the top cover 5, and connected the cover 20 to the top cover 5 with a screw 26, as shown in FIG. 9.

Figure 5:
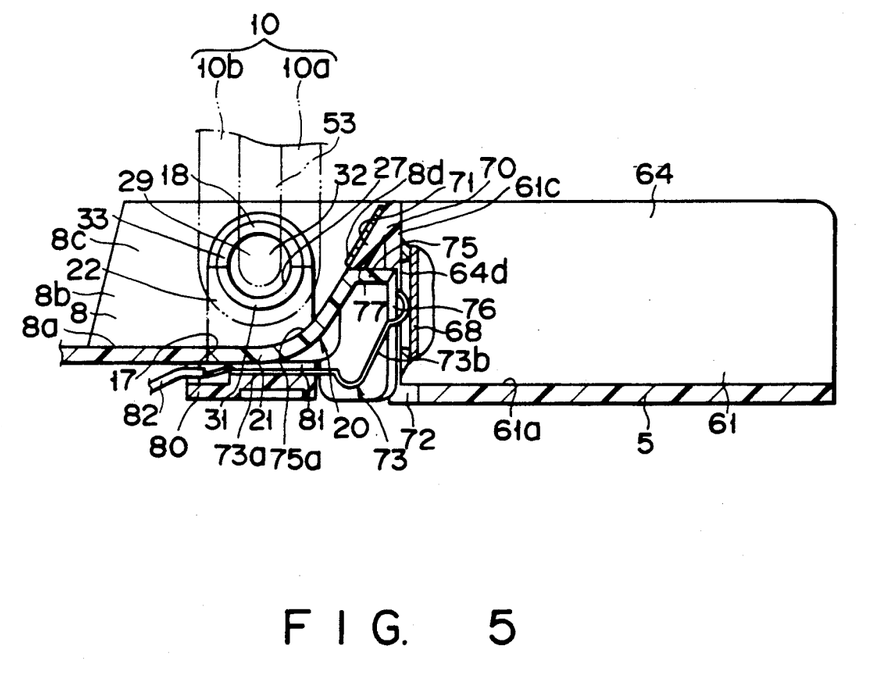
FIG. 5 is a cross sectional view showing a state that a cover, a contact terminal, and a battery are attached to the base unit.

In the upper edge portions of the side walls 22 and 23, there are formed receiving sections 27 and 28, which are cut in a form of a circular arc. The receiving sections 27 and 28 are opposed to the upper edge portions of the side opening parts 17b and 17c, and constitute circular through holes 29 and 30 opening into the top cover 5 in cooperation with the side opening parts 17b and 17c. In the receiving section 27 on the left side, there is formed a semi-cylindrical guide portion 31. The guide portion 31 is confronted with the guide portion 18 of the side opening part 17b, thereby forming a hollow shaft 33 having a guide passage 32 in the left side surface 8b of the leg mounting portion 8 as shown in FIG. 5. The guide passage 32 leads to the through hole 29, and the inside of the base unit 2 and the leg mounting portion 8 are communicated through the through hole 29.

Figure 10:
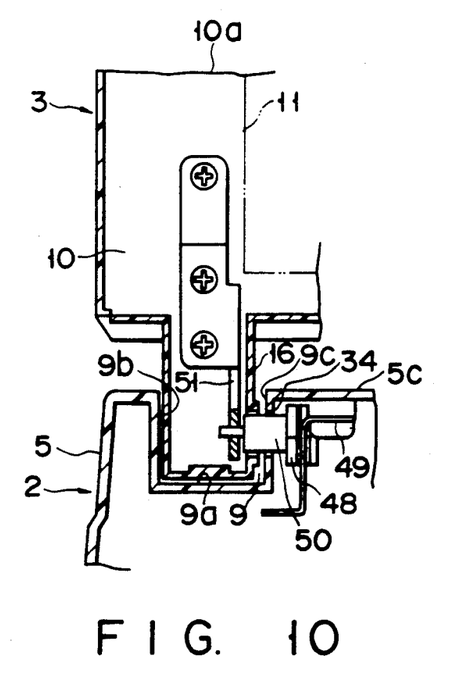
FIG. 10 is a cross sectional view showing a portion where a second leg portion of the display unit and the leg mounting portion of the base unit are coupled.

As shown in FIG. 10, the other leg mounting portion 9 of the base unit 2 has a bottom surface 9a and right and left side surfaces 9b and 9c, which are continuous with the bottom surface 9a. In the right side surface 9c of the leg mounting section 9, there is formed a through hole 34 opening into the top cover 5.

Referring now to FIG. 4, the leg portions 15 and 16 of the display unit 3 comprise a rear leg segment 37 and a front leg segment 38, respectively. The rear leg segment 37 is integrally extended from the base panel 10a of the housing 10, and the front leg segment 38 is integrally extended from the front panel 10b of the housing 10. The leg segments 37 and 38 are confronted with each other, and a cable guide passage 39 leading to the housing 10 is formed between the leg segments 37 and 38. The first leg portion 15 has opposing surfaces 15b and 15c opposing to the right and left side surfaces 8b and 8c of the leg mounting section 8. In the edges of the leg segments 37 and 38 positioned on the opposing surfaces 15b and 15c, there are formed semi-circular notch portions 37a and 38a. If the notch portions 37a and 38a are confronted with the leg segments 37 and 38, circular guide holes 40 and 41 are formed on the opposing surfaces 15b and 15c. The guide hole 40 on the left side is rotatably inserted to the outer periphery of the hollow shaft 33 (FIG. 5) and the guide passage 32 and the cable guide passage 39 are communicated through the guide hole 40.

Figure 6:
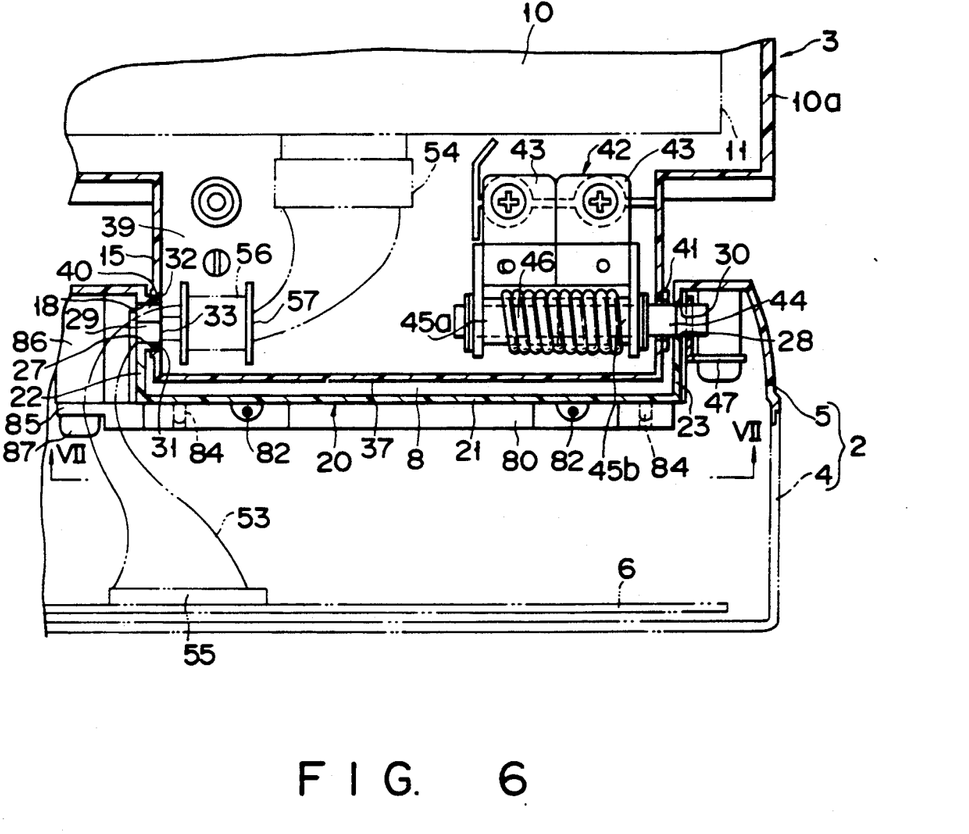
FIG. 6 is a cross sectional view showing a state that a first leg portion of the display unit is attached to the leg mounting portion of the base unit.

As shown in FIG. 6, the first leg portion 15 inserted into the leg mounting portion 8 is connected to the top cover 5 by a first hinge brake mechanism 42. The first hinge brake mechanism 42 is formed at a position, which is biased toward the right guide hole 41. The first hinge brake mechanism 42 comprises a pair of brackets 43 connected to the rear leg segment 37. In the brackets 43, a hinge shaft 44 is supported. The hinge shaft 44 is coaxial with the hollow shaft 33. On the outer periphery of the hinge shaft 44, a pair of sleeves 45a and 45b are rotatably mounted. The sleeves 45a and 45b rotate with the brackets 43 on the hinge shaft 44. A coil spring 46 is wound around the outer periphery surface of the sleeves 45a and 45b. One end of the hinge shaft 44 passes through the guide hole 41 of the first leg portion 15 and the through hole 30 of the leg mounting portion 8, and leads to the top cover 5. One end of the hinge shaft 44 is engaged with a metal fitting 47. The metal fitting 47 is connected to the inside of the top cover 5 and stops the rotation of the hinge shaft 44. Due to this, if the display unit 3 is rotated to the open position from the closed position, the sleeves 45a and 45b rotate around the outer periphery surface of the hinge shaft 43. For this reason, one sleeve 45a rotates in a direction where the coil spring 46 is wound and tightened and the other sleeve 45b rotates in a direction where the coil spring 46 is loosened. By this rotation, the coil spring 46 is tightly wound around the outer periphery surface of the one sleeve 45a, thereby large frictional force is generated between the sleeve 45a and the coil spring 46. Conversely, if the display unit 3 is rotated to the closed position from the open position, the other sleeve 45b is rotated in a direction where the coil spring 46 is wound and tightened. By this rotation, the coil spring 46 is tightly wound around the outer periphery surface of the other sleeve 45b, thereby large frictional force is generated therebetween. Therefore, the free rotation of the display unit 3 is controlled, and the display unit 3 is maintained at an arbitrarily position between the closed position and the open position.

As shown in FIG. 10, the second leg portion 16 inserted into the leg mounting portion 9 is rotatably connected to the top cover 5 by a second hinge brake mechanism 48. The second hinge brake mechanism 48 is contained in the top cover 5. The second hinge brake mechanism 48 comprises a bracket 49 connected to the top cover 5 and a hinge shaft 50, which is rotatably supported by the bracket 49. The hinge shaft 50 passes through a through hole 34 of the right side surface 9c and leads to the inside of the second leg portion 16. A metal fitting 51 is connected to the inside of the second leg portion 16. The metal fitting 51 is engaged with the hinge shaft 50. By this engagement, the hinge shaft 50 and the second leg portion 16 are rotatably connected to each other.

As shown in FIG, the printed circuit board 6 in the base unit 2 and the liquid crystal display 11 in the display unit 3 are electrically connected through a flexible cable 53. The cable 53 passes through the through hole 29 of the leg mounting portion 8 and the guide passage 32 from the inside of the base unit 2. Further, the cable 53 passes through the guide hole 40 of the first leg portion 15 from the guide passage 32, and leads to the cable guide passage 39 of the first leg portion 15. The one end of the cable 53 is positioned in the cable guide passage 39, and a first connector 54, which is electrically connected to the liquid crystal display 11, is formed in the one end. The other end of the cable 53 is positioned in the base unit 2, and a second connector 55, which is electrically connected to the printed circuit board 6, is formed in the other end. The first and second connectors 54 and 55 have a thin and long shape, respectively, and their sizes of first and second connectors 54 and 55 are larger than each inner diameter of the through hole 29, the guide passage 32, and the guide hole 40, and smaller than the size of the bottom opening part 17a.

Additionally, a sleeve 56 is connected to the outer periphery surface of the cable 53 introduced into the cable guide passage 39. The sleeve 56 is positioned between the rear leg segment 37 and the front leg segment 38. In each inner surface of the segments 37 and 38, there is projected a receiving section 57 for receiving the sleeve 56 to sandwich the sleeve 56 therebetween. Thereby, the cable 53 is prevented from being shifted from the cable guide passage 39.

Figure 3:
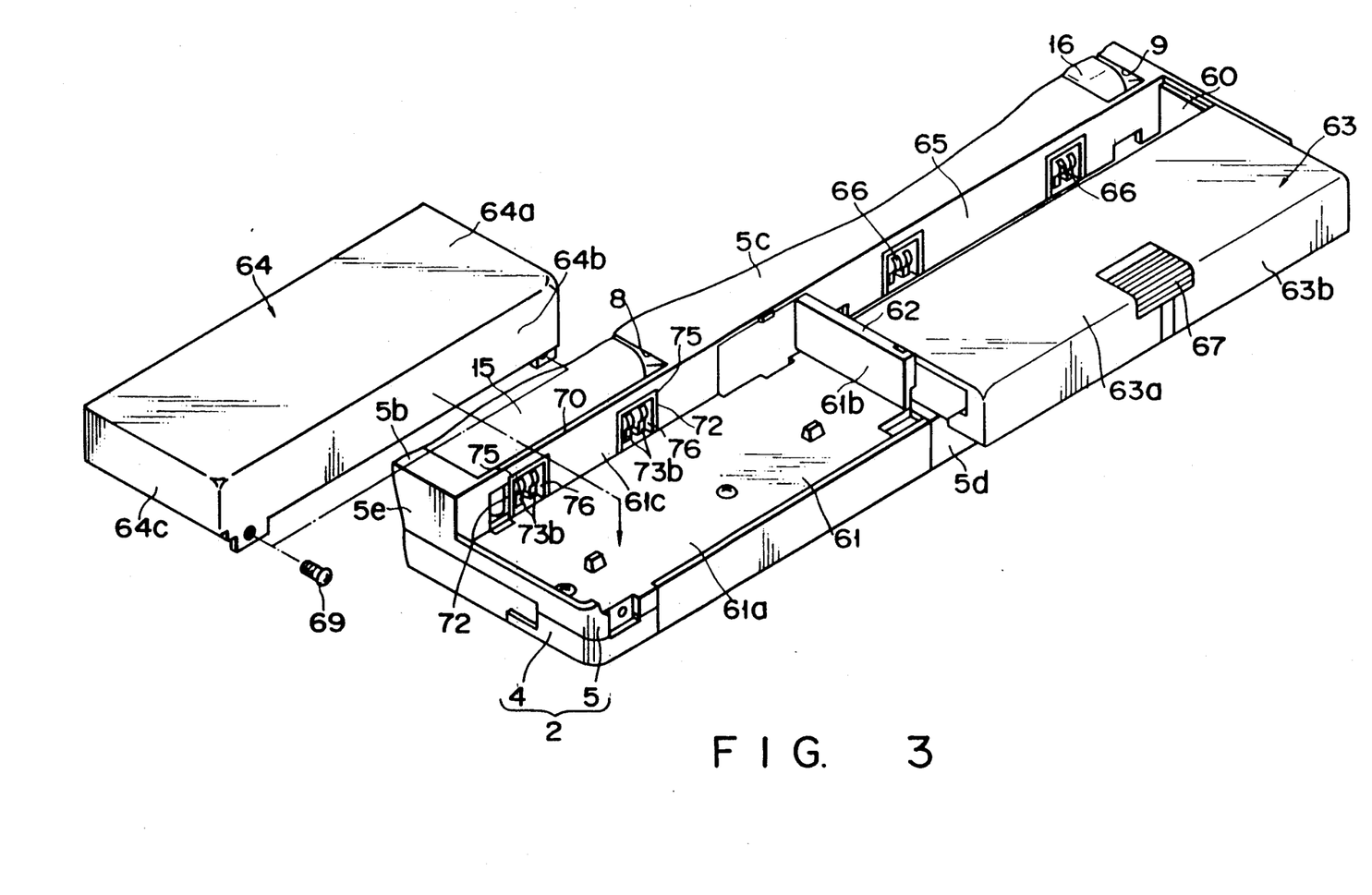
FIG. 3 is an exploded perspective view showing a state that a first and second batteries are attached to first and second mounting recess of the base unit.

As shown in FIGS. 2 and 3, in the rear portion 5b of the top cover 5, a first mounting recess 60 and a second mounting recess 61 are arranged in right and left. The first and second mounting recesses 60 and 61 are shaped thin and long in the right and left directions of the base unit 2, and open to the upper surface 5c and the rear surface 5d of the top cover 5. Moreover, the second mounting recess 61 opens to the side surface 5e of the top cover 5 in an opposite side of the first mounting recess 60. The first and second mounting recesses 60 and 61 are divided by a division wall 62 of the rear portion 5b.

First and second rechargeable type batteries 63 and 64 are detachably attached to the first and second mounting recesses 60 and 61. The batteries 63 and 64 function as a drive power source of the portable computer 1, and are shaped substantially rectangular to conform to the shapes of the openings of the mounting recesses 60 and 61. In a front surface 65 of the first mounting recess 60, there is formed a pair of contact terminals 66. The contact terminals 66 can be elastically deformed, and is exposed to the inside of the first mounting recess 60. Due to this, if the first battery 63 is attached to the first mounting recess 60, the positive and negative terminals (not shown) of the battery 63 contact the contact terminals 66, and the first battery 63 and the portable computer 1 are electrically connected to each other. In the central portion of the first battery 63 there is incorporated a lever type connecting mechanism 67 for holding a state that the first battery 63 is connected to the first mounting recess 60. In the state that the first battery 63 is connected to the first mounting recess 60, an upper surface 63a and a rear surface 63b of the battery 63 are exposed to the outward portion of the base unit 2 as shown in FIGS. 2 and 3, and constitute a part of the upper surface 5c and rear surface 5d of the rear portion 5b. Particularly, the upper surface 63a and the rear surface 63b of the battery 63 are continuous with the upper surface 5c and the rear surface 5d to be flush therewith.

Figure 11:
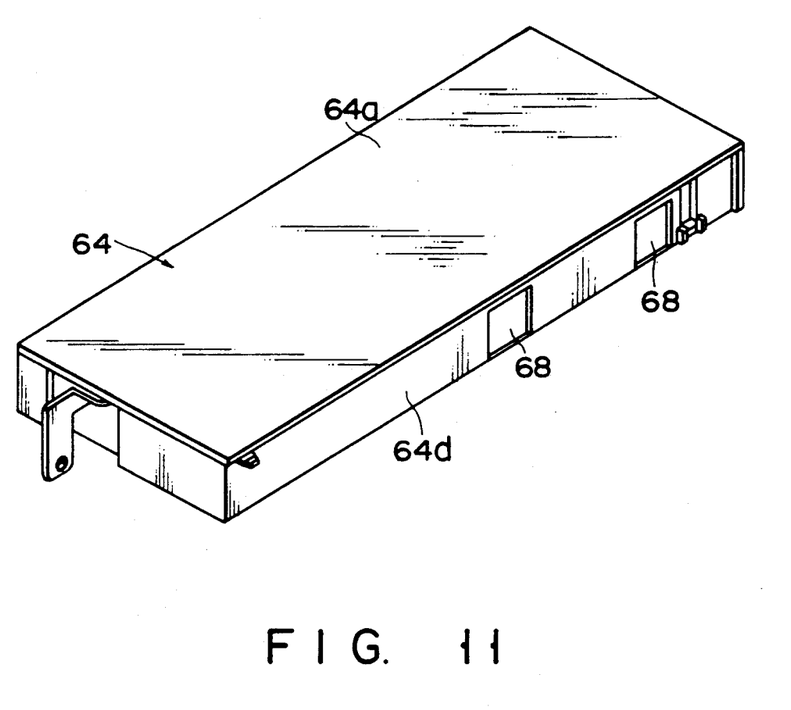
FIG. 11 is a perspective view showing the battery attached to the second mounting recess of the base unit.

As shown in FIG. 3, the second mounting recess 61 comprises a bottom surface 61a, a side surface 61b, which is continuous with the bottom surface 61a, and a front surface 61c, which is continuous with these surfaces 61a and 61b. As shown in FIG. 11, the second battery 64 to be attached to the second mounting recess 61 comprises positive and negative terminal plates 68 in a an opposing surface 64d opposing to the front surface 61c. The battery 64 is connected to the second mounting recess 61 with a screw 69 to prevent from being detached. Then, in a state that the battery 64 is connected to the second mounting recess 61, an upper surface 64a, a rear surface 64b and one side surface 64c of the battery 64 are exposed to the outward portion of the base unit 2 as shown in FIGS. 1 and 2, and constitute a part of the upper surface 5c, the rear surface 5d and the side surface 5e of the rear portion 5b. Particularly, the upper surface 64a, the rear surface 64b and side surface 64c of the battery 64 are continuous with the upper surface 5c, the rear surface 5d and side surface 5e of the rear portion 5b to be flush therewith.

As shown in FIGS. 1 to 5, the second mounting recess 61 is positioned at the portion just behind the leg mounting portion 8 where the first leg portion 15 is pivoted. Due to this, the top cover 5 comprises a division wall 70 separating the second mounting recess 61 and the leg mounting portion 8. The division wall 70 constitutes the front surface 61c of the second recess 61 and the rear surface 8d of the leg mounting portion 8. A portion 71 constituting the rear portion 8d obliquely extends downward from the upper edge of the division wall 70 to the leg mounting portion 8.

In the division wall 70, a pair of through holes 72 opening to the top cover 5 are arranged in left and right sides. The through holes 72 are formed at the position corresponding to the terminal plates 68 of the second battery 64. In the through holes 72, there is arranged a contact terminal 73 electrically contacting each terminal plate 68 as shown in FIG. 5. The contact terminal 73 is positioned between the leg mounting portion 8 and the second mounting recess 61, and supported by the cover 20 covering the opening section 17.

The supporting structure of the contact terminal 73 will be explained. As shown in FIGS. 4 and 5, in the bottom wall 21 of the cover 20, a pair of box portions 75 inserting into through hole 72 is integrally formed. The box portions 75 project to the back and upper portions from the bottom wall 21. The box portions 75 has an opening part 76 opening into the second mounting recess 61 and the inside of the top cover 5. Therefore, the through hole 72 leads to the inside of the base unit 2 through the opening part 76 of the box portions 75. The box portions 75 have a rear surface 75a exposed to the leg mounting portion 8. The rear surface 75a is continuous with the bottom wall 21 to be flush therewith. The continuous portion of the rear surface 75a is curved in a circular arc along the track of the rotation of the first leg portion 15. Then, in the rear surface 8d of the leg mounting portion 8, there is formed a pair of insertion concave portions 77 to which the box portions 75 are inserted. The rear surface 8d of the leg mounting portion 8 and the rear surface 75a of the box portions 75 are continuous to be flush with each other.

The lower surface of the bottom wall 21 is exposed to the inside of the base unit 2. A support plate 80 is overlay on the lower surface. The support plate 80 is shaped thin and long, and a pair of the connecting recessed portions 81 are formed in the above overlay portion.

The connecting recessed portion 81 is continuous with the opening part 76 of the box portion 75, and the contact terminal 73 is supported in each connecting recessed portion 81. As shown in FIGS. 4 and 5, the contact terminal 73 comprises a base portion 73a connected to the connecting recessed portion 81, and a tang piece 73b, which can elastically deformed to extend to the box portion 75 from the base portion 73a. The base portion 73a is electrically connected to the printed circuit board 6 through a lead wire 82. The tang piece 73b is contained in the box portion 75, and exposed to the second mounting recess 61 through the opening part 76.

As shown in FIG. 3, a pair of positioning holes 83 are opened to the support plate 80. These positioning holes 83 are inserted into the projection 84 projecting from the lower surface of the bottom wall 21, thereby positioning the bottom wall 21 and the support plate 80, as shown in FIG. 6.

Figure 7:
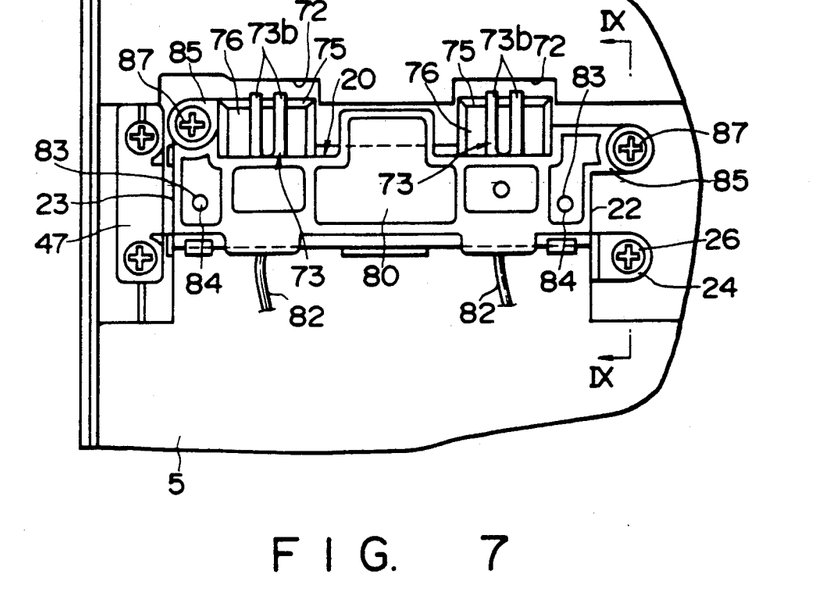
FIG. 7 is an arrow view showing a portion seen from the direction of a line VII—VII of FIG. 6.
Figure 8:
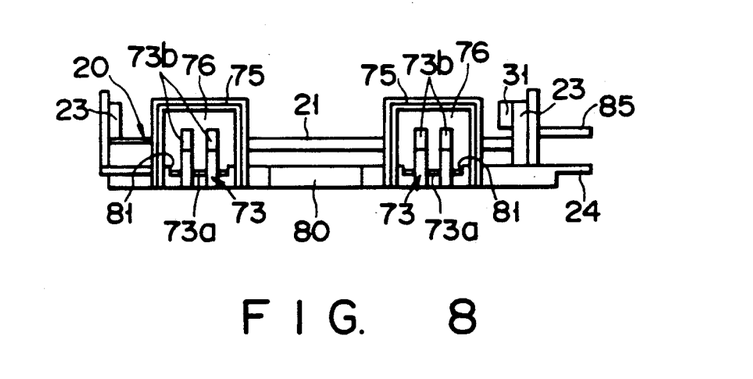
FIG. 8 is a front view showing a state that a contact terminal is attached to the cover.

Referring now to FIGS. 6 and 7, in the support plate 80, there is formed a pair of connecting pieces 85 to connect to the top cover 5. The connecting pieces 85 are positioned at both sides sandwiching the connecting recessed portions 81. These connecting pieces 85 are overlay on a boss portion 86 of the inner surface of the top cover 5, and secured to the top cover 5 with a screw 87. Therefore, the support plate 80 is secured to the top cover 5 in a state that the support plate 80 is overlay on the bottom wall 21 of the cover 20.

In the above-structured portable computer 1 the following will explain the process of wiring the cable 53 between the base unit 2 and the display unit 3.

Referring now to FIGS. 4–6, in a state that the cover 20 is detached from the top cover 5, the opening section 17 is opened over the wide range, which is from the bottom surface 8a to the right and left side surfaces 8b and 8c of the leg mounting portion 8. The inner portion of the base unit 2 and the leg mounting portion 8 are communicated through the opening section 17. Due to this, at first the cable 53 having first and second connectors 54 and 55 are passed through the opening section 17. The second connector 55 of the cable 53 is preferably connected to the printed circuit board 6 before the cable 53 is passed through the opening section 17.

Next the cover 20 is attached to the opening section 17 from the inside of the top cover 5 and the cover 20 is connected to the top cover 5. Then the bottom opening part 17a of the opening section 17 is covered with the bottom wall 21 and the side opening parts 17b and 17c are covered with the side walls 22, 23. At this time, the receiving section 27 is opposite to the upper edge of the side opening part 17b, and the through hole 29 is formed in cooperation with the side opening part 17b. Moreover, the guide portion 31 of the receiving section 27 and the guide portion 18 of the side opening part 17b confront with each other, thereby forming the hollow shaft 33 having the guide passage 32, which is continuous with the through hole 29. Due to this, in a case where the opening section 17 is covered with the cover 20, the cable 53 passed through the opening section 17 is led to the portion between the receiving section 27 and the upper edge of the side opening part 17b. Thereby, in a state that the cover 20 is connected to the top cover 5, the cable 53 passes through the through hole 29 and the guide passage 32, and is led to the leg mounting portion 8 from the base unit 2.

Thereafter, the rear leg segment 37 of the rear panel 10a is inserted into the leg mounting portion 8. In this case, one end of the hinge shaft 44 passes through the through hole 30, and is inserted into the inside of the top cover 5, and engaged with the metal fitting 47. Also, the notch 37a of the rear panel 10a is fitted into the outer periphery surface of the hollow shaft 33. Due to this, since the cable 53, which is led to the leg mounting portion 8 from the guide passage 32, is positioned on the rear leg segment 37, the cable 53 is led onto the rear panel 10a along the inner surface of the rear leg segment 37. Then, the first connector 54 is connected to the liquid crystal display 11.

Next, the front panel 10b is covered with the rear panel 10a, the rear leg segment 37 and the front leg segment 38 are confronted with each other, thereby forming the first leg portion 15 having the cable guide passage 39. Then, the notches 37a, 37b of the segments 37 and 38 are conformed to each other, and the guide hole 40 is formed in the opposing surface 15c on the left of the first leg portion 15. The cable 53 is automatically led between the notches 37a and 38a, and passed through the cable guide passage 39 from the guide passage 32 when the rear panel 10a and the front panel 10b are confronted with each other.

Therefore, the cable 53 is wired between the base unit 2 and the display unit 3 through the connected portion between the leg mounting portion 8 and the first leg portion 15.

The above-structured portable computer 1 comprises the following advantages:

The guide passage 32 of the base unit 2 is formed when the opening section 17 is covered with the cover 20. For this reason, the cable 53 is, in advance, passed through the opening section 17, which is largely opened from the bottom surface 8a to right and left side surfaces 8b, 8c of the leg mounting portion 8. Then, if the cable 53 is sandwiched between the side wall 22 of the cover 20 and the side opening part 17b when the cover 20 is connected to the top cover 5, the cable 53 is in a state that it is passed through the guide passage 32.

Moreover, the cable guide passage 39 of the display unit 3 and the guide hole 40 are formed when the rear leg segment 37 and the front leg portion 38 are confronted with each other. Due to this, the cable 53, which is led to the leg mounting portion 8 from the guide passage 32, is sandwiched between the notches 37a and 37b of the segments 37 and 38, thereby the cable 53 is in a state that it is passed through the cable guide passage 39 from the guide hole 40 when the segments 37 and 38 are confronted with each other.

As mentioned above, the segments 37 and 38 are confronted with each other in the leg mounting portion 8 after covering the opening section 17 with the cover 20. Thereby, wiring working of the cable 53, which electrically connects the base unit 2 to the display unit 3, is finished. Therefore, no complicated working being needed, for example, the cable 53 is inserted into a small hole, which takes much time. Also, by miniaturizing the base unit 2 and the display unit 3, the wiring working of the cable 53 can be easily carried out even if the inner diameter of the passage through which the cable 53 is passed is made smaller.

Moreover, in the above-structured portable computer 1, the contact terminal 73 contacting the terminal plate 68 of the second battery 64 is arranged in the front surface 61c of the second mounting recess 61. The contact terminal 73 is provided between the second mounting recess 61 and the leg mounting portion 8. Therefore, the contact terminal 73 is attached to the cover 20 constituting the through holes 29 and 30 in cooperation with the side opening part 17b.

According to the above structure, there can be used a single part, which is common to both a part for guiding the cable 53 in the leg mounting portion 8 and a part for attaching the contact terminal 73 to the top cover 5. For this reason, even if the leg mounting portion 8 and the second mounting recess 61 are adjacent to each other, there is no need that a special part for supporting the contact terminal 73 be provided between the leg mounting portion 8 and the second mounting recess 61. Moreover, there is no need for providing a space for such a part. Therefore, the contact terminal 73 can be arranged in the base unit 2 whose size is limited without problems, and the base unit 2 can be miniaturized.

The present invention is not limited to the above-mentioned embodiment, and can be variously modified within the scope of the invention.

For example, in the above embodiment, the first leg portion is formed by a rear leg segment, which is integral with the rear panel, and the front leg segment, which is integral with the front panel. The front leg segment may be separated from the front panel, and the first leg portion may be formed as a three divided structure.

Moreover, it is not limited that a pair of leg portions are formed in right and left of the display unit. One leg portion may be formed in the central portion of the display unit.

Also, the portable electronic apparatus of the present invention is not limited to the portable computer, and can be applied to the apparatus such as a word processor and the liquid crystal television.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable electronic apparatus comprising:
   a display unit including a leg portion having a cable guide passage therein;
   a base unit including an upper surface having a leg mounting portion receiving a leg portion to said upper surface and a wall including an opening section opening into said base unit, and a mounting recess opening to said upper surface adjacent to said leg mounting portion and attached a power supply thereto;
   a cover covering said opening section, having an additional wall forming a cable through hole in cooperating with said wall;
   a cable electrically connecting said display unit to said base unit, guided through said cable guide passage and said cable through hole; and
   a contact terminal exposed to said mounting recess, electrically connected to said power supply, and attached to said cover, said cover located between said mounting recess and said leg mounting portion.

2. The portable electronic apparatus according to claim 1, wherein said opening section has a bottom opening part and side opening parts, which are continuous with said bottom opening part and opening thereto, and said cover has a bottom wall covering said bottom opening part and side walls covering said side opening parts and said side walls form said cable through hole in cooperation with said wall.

3. The portable electronic apparatus according to claim 2, wherein said contact terminal is attached to said bottom wall.

4. The portable electronic apparatus according to claim 3, wherein said contact terminal has a base portion attached to said bottom wall and a tang piece, which can be elastically deformed to extend to said mounting recess from said base portion, and said tang piece is in electrical contact with said power supply.

5. The portable electronic apparatus according to claim 4, wherein said base portion is sandwiched between said bottom wall and a support plate overlay on said bottom wall.

6. The portable electronic apparatus according to claim 2, wherein said leg mounting portion has a bottom surface whose bottom opening part is opened, and said bottom surface is continuous with said bottom wall and flush therewith.

7. The portable electronic apparatus according to claim 2, wherein said leg mounting portion has a rear surface positioned at a boundary portion between said leg mounting portion and said mounting recess, and said rear surface is continuous with said bottom wall of said cover.

8. The portable electronic apparatus according to claim 2, wherein said cover is attached to said base unit to cover said opening section from the inside of said base unit.

9. The portable electronic apparatus according to claim 2, wherein said wall of said leg mounting portion has a first half cylinder, said side wall of said cover has a second half cylinder, and said first and second half cylinders form a hollow shaft having a guide passage guiding said cable in cooperation with each other.

10. The portable electronic apparatus according to claim 1, wherein said mounting recess has a bottom surface and a front surface, which is continuous with said bottom surface and positioned at a boundary portion between said bottom surface and said leg mounting portion, and said contact terminal being exposed to said front surface.

11. The portable electronic apparatus according to claim 5, wherein said front surface has a through hole exposing said contact terminal to said mounting recess.

12. The portable electronic apparatus according to claim 11, wherein said cover has a hollow box section inserted into a through hole, and said box section has an opening part opening into said mounting recess and said base unit, and said contact terminal is disposed in the inside of said box section.

13. The portable electronic apparatus according to claim 1, wherein said display unit has a rear case and a front case detachably attached to said rear case, said leg portion has a rear leg segment, which is continuous with said rear case, and a front leg segment, which is confronted with said rear leg segment, said front and rear leg segments form said cable guide passage in cooperation with each other.

14. The portable electronic apparatus according to claim 1, wherein said base unit has a front portion and a rear portion, a keyboard attached to said front portion, said display unit rotatably attached to said rear portion, and said display unit rotatable between a closed position where said keyboard is covered and an open position where said keyboard is exposed when said keyboard is used.

15. The portable electronic apparatus according to claim 14, wherein said leg portion has means for stopping said display unit at an arbitrarily position between said closed position and said open position.

16. The portable electronic apparatus according to claim 1, wherein said cable includes a first end having a first connector electrically connected to said display unit, and a second end having a second connector electrically connected to said base unit.

17. The portable electronic apparatus according to claim 16, wherein said first and second connectors are smaller in size than said opening section and larger than the inner diameter of said cable through hole.

18. A portable compute comprising:
a base unit including a leg mounting portion having an opening section and a mounting recess attaching a battery thereto functioning as a drive power source;
a display unit having a leg portion connected to said leg mounting portion;
a cover detachably attached to said base unit so as to cover said opening section; and
a contact terminal exposed to said mounting recess and being electrically in contact with said battery, and said contact terminal is attached to said cover, said cover located between said mounting recess and said leg mounting portion.

* * * * *